US012812748B2

(12) United States Patent
Zeng

(10) Patent No.: US 12,812,748 B2
(45) Date of Patent: Nov. 24, 2026

(54) COLOR CORRECTION DETECTION DEVICE AND COLOR CORRECTION SYSTEM HAVING EXTERNAL FLASH

(71) Applicant: YINGYOU EQUIPMENT CO., LTD., Shenzhen (CN)

(72) Inventor: Weiling Zeng, Shenzhen (CN)

(73) Assignee: YINGYOU EQUIPMENT CO., LTD., Shenzhen (CN)

( * ) Notice: Subject to any disclaimer, the term of this patent is extended or adjusted under 35 U.S.C. 154(b) by 540 days.

(21) Appl. No.: 18/259,223

(22) PCT Filed: Jun. 22, 2021

(86) PCT No.: PCT/CN2021/101585
§ 371 (c)(1),
(2) Date: Jun. 23, 2023

(87) PCT Pub. No.: WO2022/156138
PCT Pub. Date: Jul. 28, 2022

(65) Prior Publication Data

US 2024/0057231 A1 Feb. 15, 2024

(30) Foreign Application Priority Data

Jan. 22, 2021 (CN) ......................... 202110093847.9
Jan. 22, 2021 (CN) ........................ 202120192413.X

(51) Int. Cl.
*G03B 15/05* (2021.01)
*H04N 23/56* (2023.01)
(Continued)

(52) U.S. Cl.
CPC ............. *H05B 45/22* (2020.01); *G03B 15/05* (2013.01); *H04N 23/74* (2023.01); *H05B 45/12* (2020.01)

(58) Field of Classification Search
None
See application file for complete search history.

(56) References Cited

U.S. PATENT DOCUMENTS 4,367,932 A * 1/1983 Ishikawa ................ G03B 7/097 396/245
5,528,333 A * 6/1996 Lee ........................ G03B 15/05 396/176

(Continued)

FOREIGN PATENT DOCUMENTS

CN 1446444 10/2003
CN 1912770 2/2007

(Continued)

OTHER PUBLICATIONS

CNIPA, First Office Action for CN Application No. 202110093847.9, Dec. 31, 2024.

(Continued)

*Primary Examiner* — Beniyam Menberu
(74) *Attorney, Agent, or Firm* — Hodgson Russ LLP

(57) ABSTRACT

A color correction detection device comprises an illumination information acquisition circuit, a first communication circuit, and a second communication circuit. The illumination information acquisition circuit is used for acquiring illumination information of an external flash; the first communication circuit communicates with a terminal device and is used for sending the illumination information to the terminal device and receiving color correction result information from the terminal device; the terminal device is used for performing color correction processing according to the illumination information, and generating the color correction result information; and the second communication circuit is used for communicating with the external flash, and transmitting the color correction result information to (Continued)

the external flash, so as to correct illumination of the external flash.

18 Claims, 4 Drawing Sheets

(51) Int. Cl.

| | |
|---|---|
| ***H04N 23/74*** | (2023.01) |
| ***H04N 23/84*** | (2023.01) |
| ***H05B 45/12*** | (2020.01) |
| ***H05B 45/22*** | (2020.01) |

(56) References Cited

U.S. PATENT DOCUMENTS

| | | | | |
|---|---|---|---|---|
| 7,014,336 | B1 | 3/2006 | Ducharme et al. | |
| 9,955,546 | B1 | 4/2018 | Lu et al. | |
| 2010/0124041 | A1* | 5/2010 | Druchinin | H04N 23/88<br>362/16 |
| 2012/0026356 | A1 | 2/2012 | Nakagawara | |
| 2015/0296115 | A1 | 10/2015 | Hirasawa | |
| 2015/0312458 | A1 | 10/2015 | Chen et al. | |
| 2017/0094240 | A1* | 3/2017 | Saito | G06T 1/20 |
| 2018/0205836 | A1* | 7/2018 | Odagaki | H04N 1/00127 |
| 2019/0045103 | A1 | 2/2019 | Osawa | |

FOREIGN PATENT DOCUMENTS

| | | | | |
|---|---|---|---|---|
| CN | 103402291 | | 11/2013 | |
| CN | 103581638 | | 2/2014 | |
| CN | 106911899 | * | 6/2017 | H04N 5/225 |
| CN | 107797361 | | 3/2018 | |
| CN | 107809559 | | 3/2018 | |
| CN | 207198524 | | 4/2018 | |
| CN | 109922262 | | 6/2019 | |
| CN | 112731736 | * | 4/2021 | G03B 15/05 |
| CN | 112764293 | * | 5/2021 | G03B 15/05 |
| CN | 214751257 | | 11/2021 | |
| JP | 2002006360 | * | 1/2002 | G03B 15/05 |
| JP | 2003296720 | * | 10/2003 | G06T 1/00 |
| JP | 2005070620 | * | 3/2005 | G03B 15/05 |
| JP | 2006121163 | | 5/2006 | |
| JP | 2006322986 | | 11/2006 | |
| KR | 20060067791 | | 6/2006 | |

OTHER PUBLICATIONS

EPO, Extended European Search Report for EP Application No. 21920519.2, Jun. 5, 2024.

CNIPA, Second Office Action for CN Application No. 202110093847.9, Jun. 27, 2025.

WIPO, International Search Report for PCT/CN2021/101585, Sep. 28, 2021.

EPO, Communication for EP Application No. 21920519.2, Apr. 28, 2026.

"Instruction Manual," Testo 540, retrieved from the internet: <htpp:///www.testo.com>, Dec. 23, 2017.

Indian Patent Office, Hearing Notice in Reference of Indian Patent Application No. 202317043079, Aug. 21, 2026.

* cited by examiner

COLOR CORRECTION DETECTION DEVICE AND COLOR CORRECTION SYSTEM HAVING EXTERNAL FLASH

CROSS-REFERENCE TO RELATED APPLICATIONS

This application is a national stage entry under 35 U.S.C. § 371 of International Application No. PCT/CN2021/101585, filed Jun. 22, 2021, which claims priority to Chinese Patent Application Nos. 202110093847.9 and 202120192413.X, each filed Jan. 22, 2021. The entire disclosures of the above-identified applications are incorporated herein by reference.

FIELD OF TECHNOLOGY

The present application relates to the technical field of photographing-specific flash, and more particularly, to a color correction detection device and a color correction system having an external flash.

BACKGROUND

With the development of mobile communication technology, mobile terminals play an increasingly important role in people's life and work. Especially there are some mobile electronic terminal devices with photographing functions, such as mobile phone, MP4, PDA, and notebook computer. The camera functions inherent in these mobile terminal devices can bring great fun to people's lives. Photographing requires light sources, and artificial light is often needed to assist in photographing besides natural light. An artificial light source of the mobile terminal with photographing functions often cannot meet the actual use requirements. Therefore, people often use an external flash to assist in photographing.

However, after long-term use of LED lamp beads in the external flash, there will be deviations in chroma and illumination intensity, resulting in the fact that actual illumination brightness, chroma, and other illumination parameters cannot reach preset illumination parameters so that the expected light filling effect cannot be realized.

The above information disclosed in the Background is only for the enhancement of understanding of the background of the present disclosure and therefore it may include information that does not constitute prior art known to a person of ordinary skill in the art.

SUMMARY

There are provided a color correction detection device and a color correction system having an external flash according to embodiments of the present disclosure. The technical solution is as below:

According to one aspect of the present application, a color correction detection device is provided in the present application, including:

- an illumination information acquisition circuit configured to acquire illumination information of an external flash;
- a first communication circuit, communicating with a terminal device and configured to transmit the illumination information to the terminal device and receive color correction result information from the terminal device, where the terminal device is configured to perform color correction processing according to the illumination information, and generate the color correction result information; and
- a second communication circuit configured to communicate with the external flash and transmit the color correction result information to the external flash, so as to correct illumination of the external flash.

According to another aspect of the present application, a color correction system having an external flash is further proposed, which includes an external flash, the above color correction detection device, and a terminal device;

where the color correction detection device, communicating with the terminal device, is configured to transmit the acquired illumination information to the terminal device; the terminal device is configured to perform color correction processing according to the illumination information, generating the color correction result information, and transmit the color correction result information to the color correction detection device; the color correction detection device communicates with the external flash, so as to transmit the color correction result information to the external flash; and the external flash corrects illumination according to the color correction result information.

It should be understood that the above general description and the following detailed description are exemplary and explanatory only and are not intended to limit the present application.

BRIEF DESCRIPTION OF THE DRAWINGS

The above and other objects, features, and advantages of the present application will become more apparent by describing in detail exemplary embodiments thereof with reference to the accompanying drawings.

DETAILED DESCRIPTION OF THE EMBODIMENTS

Figure 1:
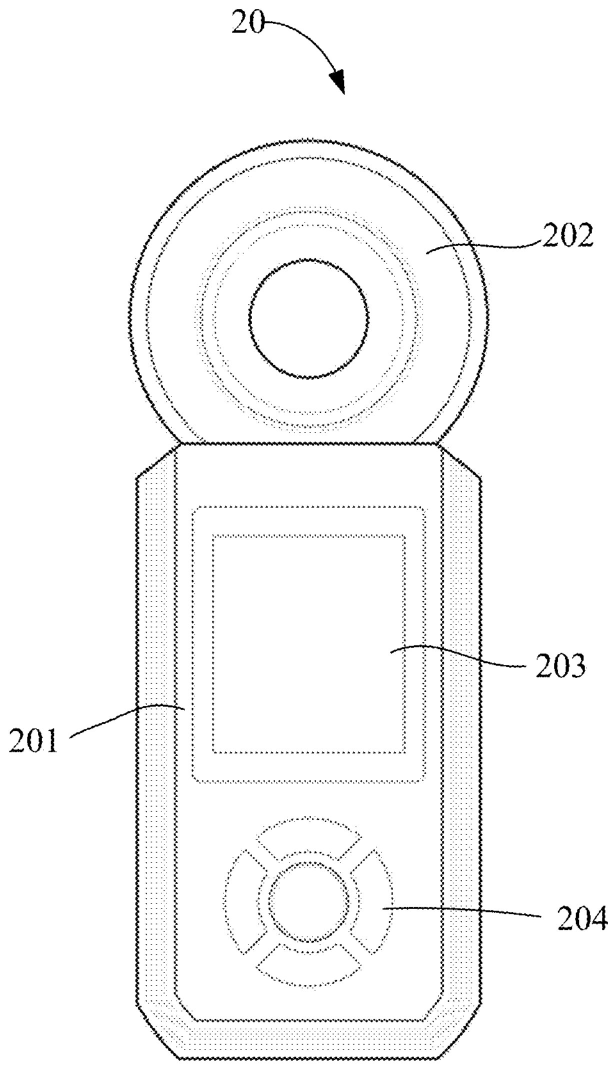
FIG. 1 shows a schematic structural diagram of a color correction detection device according to an example embodiment.

Although the present application can readily be embodied in different forms of embodiment, however, only some of the specific embodiments are shown in the drawings and will be described in detail in the description, while it is understood that the description is to be regarded as an exemplary illustration of the principles of the present application and is not intended to limit the present application to those described herein.

Thus, one feature pointed out in the description is intended to illustrate one of the features of one embodiment of the present application and is not intended to imply that each embodiment of the present application must have the illustrated feature. In addition, it should be noted that many features are described in the description. Although certain features may be combined to illustrate a possible system design, these features may also be used for other unspecified combinations. Therefore, unless otherwise stated, the illustrated combinations are not intended to be limiting.

In the embodiments illustrated in the drawings, indications of direction (such as up, down, left, right, front, and rear) are used to explain that the structure and movement of the various elements of the present application are not absolute but relative. These descriptions are appropriate when these elements are in the positions shown in the drawings. If the description of the positions of the element changes, the indications of these directions will also be changed accordingly.

The exemplary embodiments will now be described more fully with reference to the accompanying drawings. However, the example embodiments can be implemented in a variety of forms and should not be construed as being limited to the examples set forth herein. Rather, these embodiments are provided so that the present application will be more comprehensive and complete, and the concept of example embodiments will be fully communicated to those skilled in the art. The drawings are only schematic illustrations of the present application and are not necessarily drawn to scale. Like reference numerals in the drawing denote identical or similar parts and thus repetitive descriptions thereof will be omitted.

The embodiments of the present application are further elaborated below in conjunction with the drawings of the description.

A color correction detection device is first proposed in the present application, which is used for color correction for the external flash. Color correction may refer to matching the actual illumination parameters of the external flash with the set illumination parameters, and color correction may also refer to adjusting the consistency of illumination parameters of each LED lamp bead in the external flash.

Figure 2:
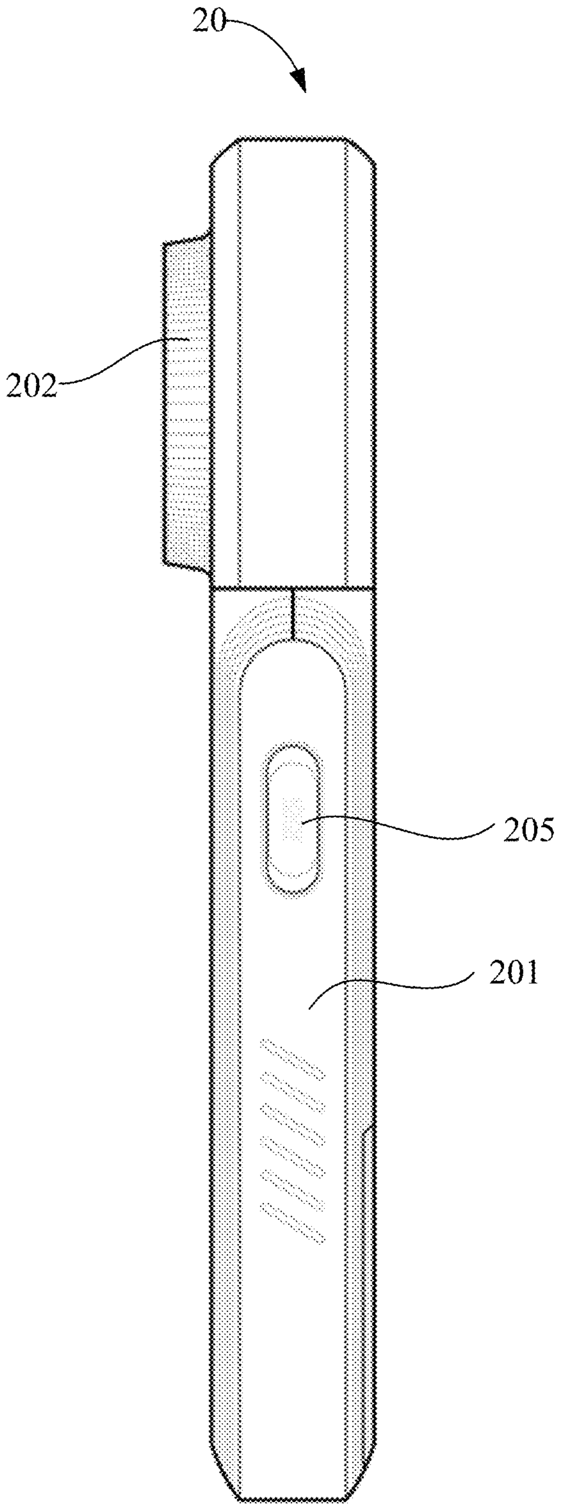
FIG. 2 is a side view of FIG. 1.

Referring to FIG. 1 and FIG. 2, in an embodiment, a color correction detection device 20 includes a main body 201 and a light pick-up portion 202 protruding from one side of the main body 201. Specifically, the main body 201 is roughly square, and an accommodating chamber is provided inside the main body 201 to accommodate one or more circuit boards. It should be understood that relevant circuits of the present application may be partially or completely laid on the circuit board. A side surface of the main body 201 is further provided with a switch key 205, and when the switch key 205 is on, the color correction detection device 20 is turned on, and when the switch key 205 is off, the color correction detection device 20 is turned off. The light pick-up portion 202 is located on the upper side of the main body 201. Since the light radiation range of the external flash 10 is roughly circular, the light pick-up portion 202 provided in the present application is also roughly circular, so as to uniformly pick up a light beam emitted by the external flash 10. The color correction detection device 20 in the present application may be a handheld device, so as to facilitate a user to carry outdoors to perform color correction on the external flash at any time.

The main body 201 and the light pick-up portion 202 may be detachably connected. Specifically, the connection may be a snap-fit connection or a connection that is formed by cooperation between a slide chute and a sliding block, where the slide chute is provided on the main body 201, and the sliding block is provided on the light pick-up portion 202.

Figure 3:
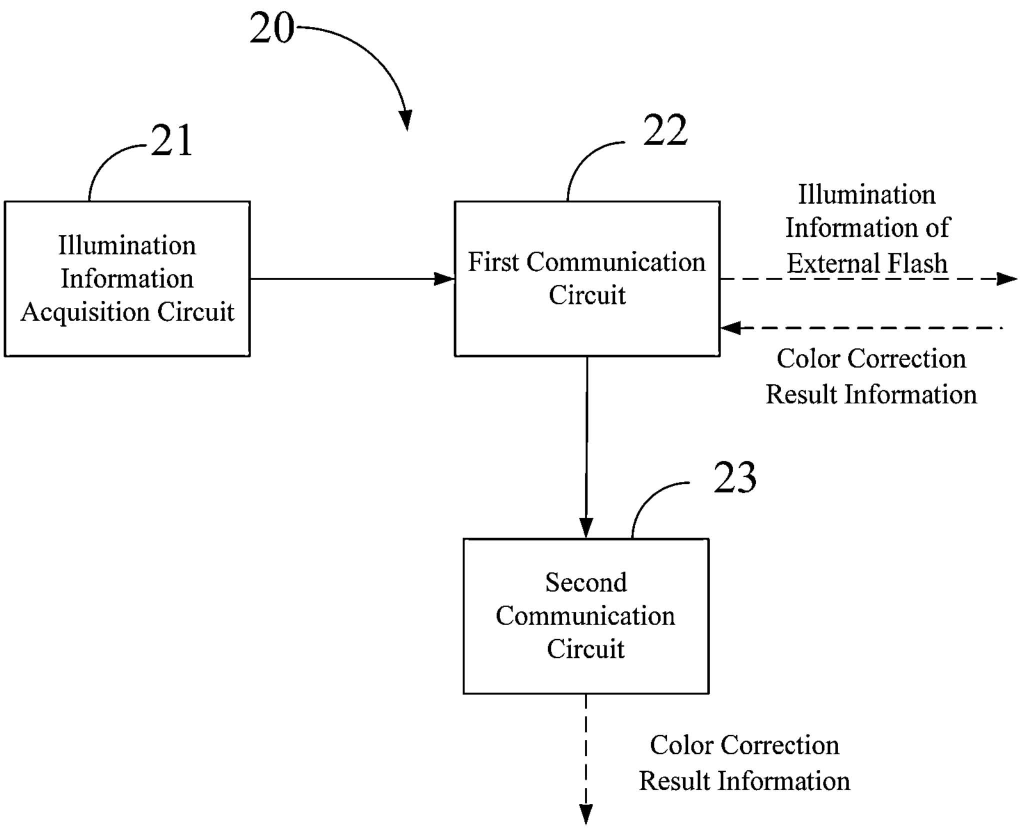
FIG. 3 shows a circuit block diagram of a color correction detection device according to an example embodiment.

Referring to FIG. 3, in an embodiment, the color correction detection device 20 includes an illumination information acquisition circuit 21, a first communication circuit 22, and a second communication circuit 23. The illumination information acquisition circuit 21 is used for acquiring illumination information of an external flash 10. The first communication circuit 22 communicates with a terminal device 30 and is used for transmitting the illumination information to the terminal device 30 and receiving color correction result information from the terminal device 30. The terminal device 30 is used for performing color correction processing according to the illumination information, and generating the color correction result information; and a second communication circuit 23 is used for communicating with the external flash 10 and transmitting the color correction result information to the external flash 10, so as to correct illumination of the external flash 10.

Here, the illumination information includes one or more pieces of information of brightness, chroma, saturation, etc. Here, the external flash 10 may be taken as a whole to acquire its parameters such as brightness, chroma, saturation, etc. In another embodiment, in the case that a flash includes multiple LED light sources, the illumination information is one or more parameters of brightness, chroma, saturation, and the like of each LED light source. That is, in this embodiment, each LED light source is used as a minimum circuit to perform illumination correction on each LED in a targeted manner, so as to improve the accuracy of illumination correction. During the detection, each LED light source may be enabled to emit light independently, thus the illumination information of the LED light source is obtained.

The illumination information acquisition circuit 21 may include a color pick-up circuit. According to a target to be corrected, the color pick-up circuit may include various types of light sensors, such as brightness sensor, chroma sensor, and color temperature sensor. The illumination information acquisition circuit 21 usually includes an acquisition window, and the acquisition window is exposed on a surface of the color correction detection device 20. The acquisition window is provided facing the illumination surface of the external flash 10, thus the color pick-up circuit can receive the light emitted by the external flash 10. Here, the light emitted by the external flash may be picked up multiple times. Schematically, the external flash 10 is enabled to operate in various illumination modes and illumination information in each mode is sampled. Here, the illumination modes include flashing mode, modeling light mode, constant lighting mode, etc. In each mode, the illumination information is picked up at least once.

In an embodiment, the color correction detection device 20 includes a data conversion circuit, and the data conversion circuit is electrically connected to the illumination information acquisition circuit 21, so as to convert an analog quantity of the acquired illumination information to a digital quantity of the illumination information. Specifically, the data conversion circuit may be an A/D conversion circuit. The digital quantity of the illumination information is convenient for transmission through a communication network system, reducing data loss and improving the stability of data transmission.

Figure 4:
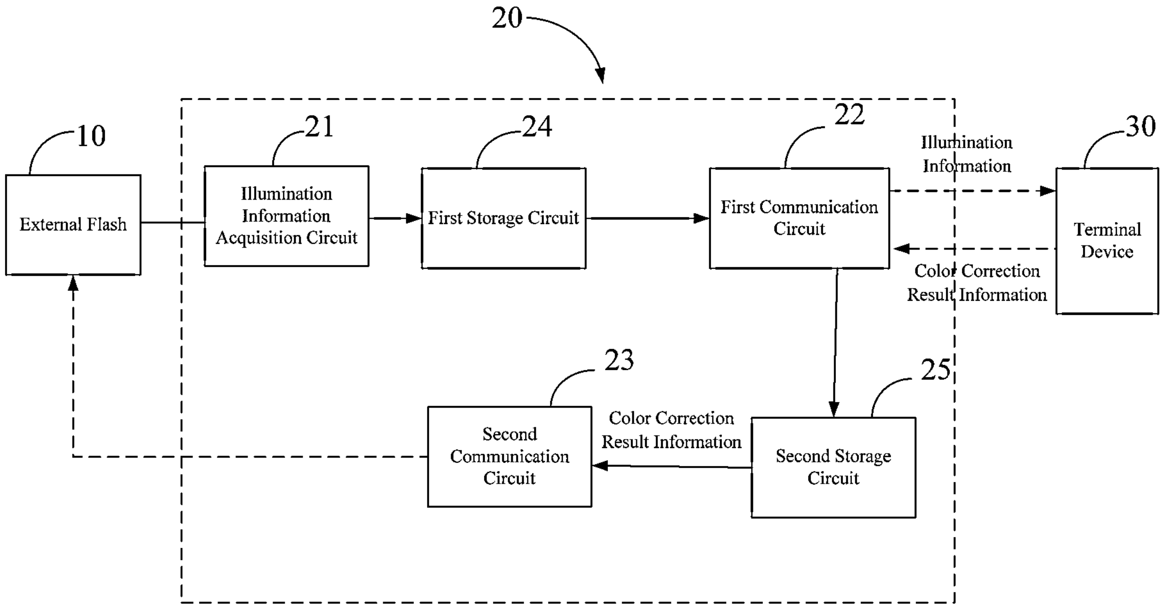
FIG. 4 shows a circuit block diagram of a color correction system having an external flash according to an example embodiment.
Figure 5:
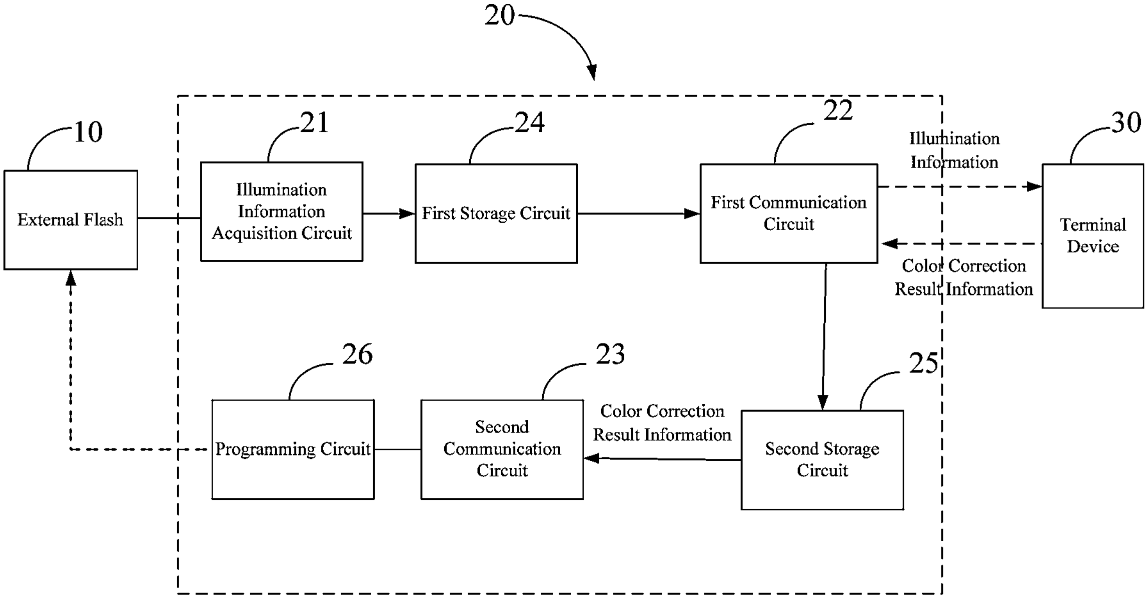
FIG. 5 shows a circuit block diagram of a color correction system having an external flash according to an example embodiment.

Referring to FIG. 4 and FIG. 5, in an embodiment, the color correction detection device 20 further includes a first storage circuit 24, and the first storage circuit 24 is electrically connected to the illumination information acquisition circuit 21, so as to store the illumination information; and the first storage circuit 24 is connected to the first communication circuit 22, so as to transmit the stored illumination information to the terminal device 30 through the first communication circuit 22.

Therefore, in this embodiment, the color correction detection device 20 may be used for acquiring multiple groups of illumination information and storing the illumination information. Then, if conditions permit, the color correction detection device 20 may establish a communication connection with the terminal device 30 to transmit the stored illumination information to the terminal device 30, realizing the color correction processing of the illumination information. This embodiment improves the flexibility and convenience of the color correction detection device 20.

In an embodiment, the first communication circuit 22 includes a wireless communication circuit; and the wireless communication circuit includes one or more of a WIFI module, a Bluetooth module, a Zig-Bee module, and an infrared communication module. This embodiment improves the convenience of communication between the color correction detection device 20 and the terminal device 30. And the arrangement of the wireless communication circuit can eliminate the need for providing interfaces on the color correction detection device 20 and the terminal device 30.

In another embodiment, the first communication circuit 22 includes a first communication interface, where the first communication interface is one of a USB interface, a TYPE C interface, an RS232 interface, and an RS485 interface.

Here, the terminal device 30 may be a smart terminal, such as mobile phone, tablet, or notebook computer; and the terminal device 30 may also be a smart wearable device, such as smart head-mounted device, smart bracelet, or smart belt. The terminal device 30 is widely used in today's work and life. The solution of the present application combines the color correction detection device 20 with the terminal device 30, which is conducive to reducing the volume of the color correction detection device 20 and making it easy for the user to carry.

In an embodiment, the terminal device 30 may include a display screen, and the display screen is used for displaying a color correction control interface, where the interface may be a GUI (Graphical User Interface) interface, and a displayed content of the color correction control interface includes one or more of color correction start/stop information, color correction parameter setting information, and color correction mode switching information. Specifically, a color correction application software may be installed in the terminal device 30, and when the color correction application software is running, a color correction control interface may be displayed on the display screen. The color correction control interface includes multiple controls for the user to send a color correction start instruction, set a color correction parameter, select a color correction mode, etc. (hereinafter referred to as color correction control instructions). The color correction control interface may further include a display window to display color correction progress. This embodiment improves the intelligence of the color correction detection device 20, improves the human-computer interaction ability, and makes it convenient for the user to correct the different parameters (brightness, chroma, saturation, etc.) of the external flash 10 according to the user's needs, and correct these parameters to target parameters that meet the user's requirements.

The terminal device 30 is internally provided with a color correction processing circuit. The terminal device 30, after receiving the color correction control instruction transmitted by the user, transmits the instruction to the color correction processing circuit through the first communication circuit 22, so that the color correction processing circuit performs color correction processing on the illumination information of the external flash 10 according to the color correction control instruction, thus generating the corresponding color correction result information.

Specifically, the color correction processing circuit may include a data sorting circuit and a data processing circuit. The data sorting circuit performs data sorting on the digital quantity of the acquired illumination information. The specific data sorting method may be determined according to a color correction algorithm, and the digital quantity of the acquired illumination information may also be sorted one by one according to the position of the LEDs in the external flash 10.

A color correction processing algorithm may be stored in the data processing circuit. The above arranged illumination data will be logically calculated with the color correction processing algorithm, thus generating color correction result information. The color correction result information may be an adjustment program or a specific illumination correction value.

Schematically, in one example, the data processing circuit includes a color correction chip, and the color correction chip is internally provided with a correction coefficient matrix. Based on the correction coefficient matrix, the above sort sampled data is calculated and processed.

In another case, a preset parameter value is compared with the sampled illumination information sorting data to correct a driving current of the external flash 10. The external flash 10 driven by the corrected driving current can enable the actual illumination parameters of the flash to exactly match the set parameters.

In this embodiment, the terminal device 30 performs a sorting process on the acquired illumination information, and since data sorting and processing requires fast operation speed and storage capacity, the data sorting speed and the processing speed may be improved by using a powerful processor and large storage capacity of the terminal device 30. Since there is no need to provide a data processing circuit in the color correction detection device 20, the volume of the color correction detection device 20 can be reduced, which is conducive to improving the portability of the color correction detection device 20.

Of course, in some embodiments, the color correction processing circuit may include the above data sorting circuit. The data sorting circuit is connected to an analog-to-digital conversion circuit, so as to perform data sorting on a digital quantity of the acquired illumination information. The specific data sorting method may be determined according to a color correction algorithm, and the digital quantity of the acquired illumination information may also be sorted one by one according to the position of the LEDs in the external flash 10.

In the above embodiment, the second communication circuit 23 is used for communicating with the external flash 10, so as to transmit the color correction result information to the external flash 10.

In an embodiment, the second communication circuit 23 includes a wireless communication circuit; and the wireless communication circuit includes one or more of a WIFI module, a Bluetooth module, a Zig-Bee module, and an infrared communication module.

In another embodiment, the second communication circuit 23 includes a second communication interface, where the second communication interface is one of a USB interface, a TYPE C interface, an RS232 interface, and an RS485 interface. The second communication interface may be provided on the housing of the color correction detection device 20.

In an embodiment, the color correction detection device 20 further includes a second storage circuit 25, and the second storage circuit 25 is electrically connected to the second communication circuit 23, so as to store the color correction result information received by the second communication circuit 23. The second storage circuit 25 may store the color correction result information of the terminal device 30 so as to transmit the color correction result information to the external flash at an appropriate time to realize the final correction process. This embodiment improves the flexibility and convenience of color correction. And in this embodiment, the second storage circuit 25 may store the color correction result information of a plurality of external flashes 10, so as to improve the utilization rate of the color correction detection device 20.

Referring to FIG. 4 and FIG. 5, generally, the external flash 10 includes a control chip, a driving circuit, and a light source circuit. The control chip sends a control signal to the driving circuit, and then the driving circuit drives the light source circuit to emit light. In an embodiment, the color correction detection device 20 further includes a programming circuit 26, and the programming circuit 26 is electrically connected to the second communication circuit 23, so as to program the color correction result information on the control chip in the external flash 10.

In this embodiment, the programming circuit 26 may be in handshake communication with the control chip and satisfy relevant communication protocols, so that the programming can proceed smoothly, thus fundamentally correcting the deviation of the illumination effect of the external flash 10.

Here, the programming circuit 26 may be directly or indirectly electrically connected to the second storage circuit 25. In an example, the second communication circuit 23 obtains the color correction result information from the second storage circuit 25 and transmits the color correction result information to the programming circuit 26 in a wired or wireless manner (there is a corresponding wireless receiving unit in the programming circuit 26), and then the programming circuit 26 programs the color correction result information on the control chip of the external flash 10. In another example, the second communication circuit 23 may also be omitted, and the programming circuit 26 directly obtains the color correction result information from the second storage circuit 25 and programs the color correction result information on the control chip in the external flash 10. The programming circuit 26 may be built into the housing of the color correction detection device 20; or the programming circuit 26 may be external to the housing of the color correction detection device 20 to form an independent module.

Figure 6:
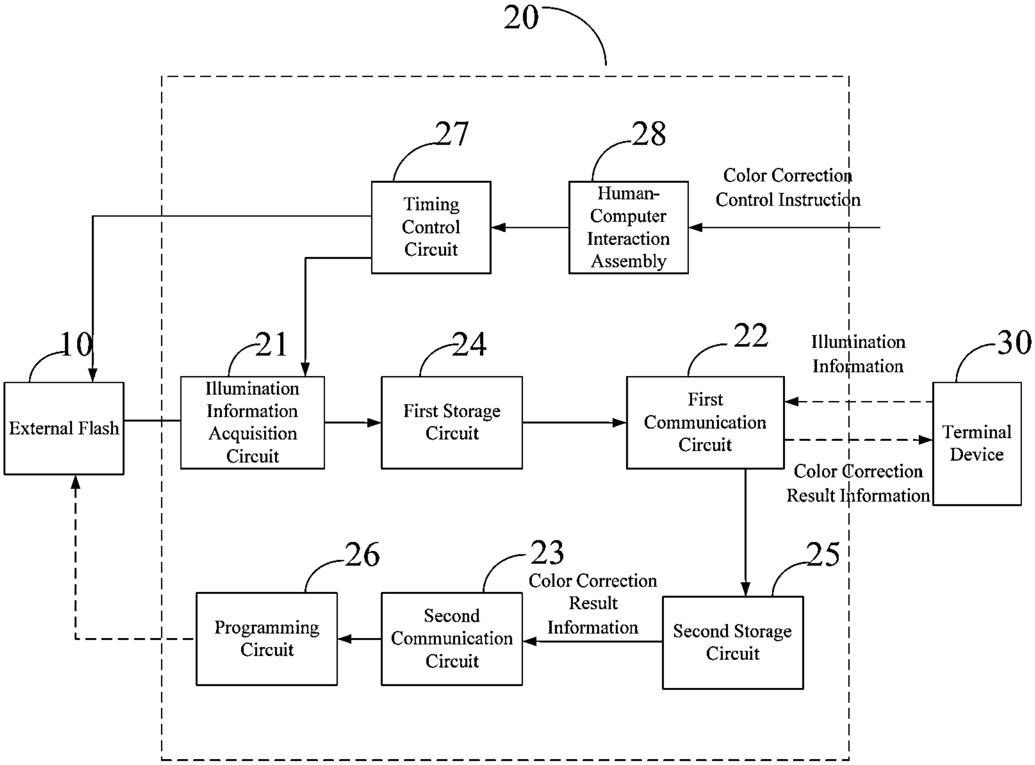
FIG. 6 shows a circuit block diagram of a color correction system having an external flash according to an example embodiment.

Referring FIG. 6, in an embodiment, the color correction detection device 20 further includes a timing control circuit 27, and the timing control circuit 27 is electrically connected to the external flash 10, so as to drive the external flash 10 to emit light at a preset timing. The timing control circuit 27 is electrically connected to the illumination information acquisition circuit 21, so that when the external flash 10 emits light at the preset timing, the timing control circuit 27 controls the illumination information acquisition circuit 21 to detect illumination information of the external flash 10 at the preset timing.

Here, the timing control circuit 27 may transmit a corresponding timing control signal according to the color correction control instruction (the color correction control instruction may be generated by the color correction detection device 20 or set by the user, or transmitted by the terminal device 30). The timing control circuit 27 may transmit timing instructions including illumination mode execution sequence, illumination frequency, brightness-changing timing, color-changing timing, and the like of the external flash 10. The arrangement of the timing control circuit 27 makes the acquisition timing and the illumination timing synchronous, so that the timing information corresponding to the acquired illumination information can be determined, and the accuracy of correction can be improved. In addition, this embodiment allows the color correction detection device 20 not to acquire data when the external flash 10 does not emit light, which is conducive to reducing noise interference of the color correction detection device 20 and improving the accuracy of the acquired illumination data; and it is also conducive to energy conservation.

Referring to FIG. 6, in an embodiment, the color correction detection device 20 may also include a human-computer interaction assembly 28, used for inputting a color correction control instruction. The human-computer interaction assembly 28 may be a key assembly, a touch screen assembly, a voice input assembly, a gesture input assembly, etc. The color correction control instruction is input by operating the human-computer interaction assembly 28. The timing control circuit 27 is electrically connected to the human-computer interaction assembly 28, so as to control an illumination timing of the external flash 10 and an acquisition timing of the illumination information acquisition circuit 21 according to the received color correction control instruction. In a specific embodiment, the human-computer interaction assembly 28 includes a key 204 provided on the main body 201.

The color correction control instruction includes but is not limited to the color correction start/stop instruction, color correction parameter setting instruction, color correction mode switching instruction, color correction accuracy setting instruction, etc.

The human-computer interaction assembly 28 is electrically connected to the first communication circuit 22 in the color correction detection device 20, so as to transmit the color correction control instruction to the terminal device 30 through wireless or wired communication. The human-computer interaction assembly 28 communicates with the external flash 10 through the second communication circuit 23. The external flash 10 adjusts the illumination manner according to the color correction control instruction, and the color correction detection device 20 adjusts the illumination information acquisition manner according to the color correction control instruction.

In an embodiment, the color correction detection device 20 may further include a display screen 203, and the display screen 203 is used for displaying a color correction control interface. A displayed content of the color correction control interface includes one or more of color correction start/stop information, color correction parameter setting information, and color correction mode switching information.

Specifically, a color correction application software may be installed in the color correction detection device 20, and when the color correction application software is running, the color correction control interface may be displayed on the display screen 203. The color correction control interface includes multiple controls for the user to send a color correction start instruction, set a color correction parameter, select a color correction mode, etc. (hereinafter referred to as color correction control instructions). The color correction control interface may further include a display window to display color correction progress. This embodiment improves the human-computer interaction ability, and makes it convenient for the user to correct different parameters (brightness, chroma, saturation, etc.) of the external flash 10 according to the user's needs, and correct these parameters to target parameters that meet the user's requirements. The color correction control instruction may be transmitted to the terminal device 30 through the first communication circuit 22, so that the terminal device 30 processes the illumination information according to the color correction control instruction.

The display screen 203 may also communicate with the terminal device 30 through the first communication circuit 22 to display the above color correction control interface. The realization of "electrical connection" herein may require that the display screen 203 and the terminal device 30 can realize data transmission there between.

The above color correction parameters may include color correction accuracy parameters, color correction target parameters, etc., The color correction mode may include an illumination correction mode, a chroma correction mode, a saturation correction mode, and a comprehensive correction mode (simultaneously correcting brightness, chroma, saturation, etc.).

In an embodiment, the display screen may be a touch screen, which displays a virtual key for transmitting the start/stop color correction instruction, a virtual keyboard for inputting color correction parameters, color correction mode, and a drop-down menu. This embodiment effectively facilitates the user's operation and is conducive to reducing the volume of the color correction detection device 20.

In an embodiment, the color correction detection device 20 further includes a charging circuit, and an input of the charging circuit is connected to power, and an output of the charging circuit is electrically connected to the external flash 10. Specifically, the charging circuit may include a voltage conversion circuit, a current sampling circuit, etc. The arrangement of the charging circuit enables the color correction detection device 20 to be used as an adapter, improving the versatility of the color correction detection device 20, and thus providing the user with diversified services.

The "circuit" mentioned in the above embodiments, such as the illumination information acquisition circuit 21, the color correction processing circuit, the communication circuit, the programming circuit 26, the timing control circuit 27, the receiving circuit, and the display circuit, may be built by adopting physical circuits or specific chips.

The above illumination information and color correction result information may represent the substantial meaning of the signal. In fact, in the process of signal transmission, the form will change. For example, the conversion of the analog quantity and the digital quantity, transmission in the form of a single signal or packaging into data packets, etc., are not specifically limited herein.

A color correction system having an external flash 10 is further proposed in the present application, including an external flash 10, a color correction detection device 20, and a terminal device 30. The color correction detection device 20, communicating with the terminal device 30, is used for transmitting the acquired illumination information to the terminal device 30. The terminal device 30 is used for performing color correction processing according to the illumination information, generating the color correction result information, and transmitting the color correction result information to the color correction detection device 20. The color correction detection device 20 communicates with the external flash 10, so as to transmit the color correction result information to the external flash 10; and the external flash 10 corrects illumination according to the color correction result information. The color correction system having the external flash 10 of the present application can correct the illumination of the external flash 10.

While the present application has been described with reference to several exemplary embodiments, it should be understood that the terms used herein are illustrative and exemplary and are not limiting. Since the present application can be embodied in various forms without departing from the spirit or essence of the invention, it should therefore be understood that the foregoing embodiments are not limited to any of the foregoing details, but should be construed broadly within the spirit and scope of the appended claims, so that all variations and modifications falling within the scope of the claims or their equivalents are to be covered by the appended claims.

What is claimed is:

1. A color correction detection device, comprising:

an illumination information acquisition circuit configured to acquire illumination information of an external flash;

a first communication circuit communicating with a terminal device, configured to transmit the illumination information to the terminal device and receive color correction result information from the terminal device, wherein the terminal device is configured to perform color correction processing according to the illumination information, and generate the color correction result information; and a second communication circuit electrically connected to the first communication circuit, configured to communicate with the external flash and transmit the color correction result information to the external flash, so as to correct illumination of the external flash;

wherein the color correction detection device further comprises a programming circuit, and the programming circuit is electrically connected to the second communication circuit, so as to program the color correction result information on a control chip in the external flash.

2. The color correction detection device according to claim 1, wherein the first communication circuit comprises a wireless communication circuit, and the wireless communication circuit comprises one or more of a WIFI module, a Bluetooth module, a Zig-Bee module, and an infrared communication module.

3. The color correction detection device according to claim 2, wherein the first communication circuit comprises a first communication interface, wherein the first communication interface is one of a USB interface, a TYPE C interface, an RS232 interface, and an RS485 interface.

4. The color correction detection device according to claim 1, wherein the color correction detection device further comprises a first storage circuit, and the first storage circuit is electrically connected to the illumination information acquisition circuit, so as to store the illumination information, and wherein the first communication circuit is connected to the first storage circuit, so as to transmit the stored illumination information to the terminal device.

5. The color correction detection device according to claim 1, wherein the second communication circuit comprises a wireless communication circuit, and wherein the wireless communication circuit comprises one or more of a WIFI module, a Bluetooth module, a Zig-Bee module, and an infrared communication module.

6. The color correction detection device according to claim 5, wherein the second communication circuit comprises a second communication interface, wherein the second communication interface is one of a USB interface, a TYPE C interface, an RS232 interface, and an RS485 interface.

7. The color correction detection device according to claim 1, wherein the color correction detection device further comprises a second storage circuit, and wherein the second storage circuit is electrically connected to the second communication circuit, so as to store the color correction result information received by the second communication circuit.

8. The color correction detection device according to claim 1, wherein the color correction detection device comprises a data conversion circuit, and wherein the data conversion circuit is electrically connected to the illumination information acquisition circuit, so as to convert an analog quantity of the acquired illumination information to a digital quantity of the illumination information.

9. The color correction detection device according to claim 8, wherein the color correction detection device comprises a data sorting circuit, and the data sorting circuit is electrically connected to the data conversion circuit, so as to sort the digital quantity of the illumination information.

10. The color correction detection device according to claim 1, wherein the color correction detection device further comprises a timing control circuit, and wherein the timing control circuit is electrically connected to the external flash, so as to drive the external flash to emit light at a preset timing; and wherein the timing control circuit is electrically connected to the illumination information acquisition circuit, so that when the external flash emits light at the preset timing, the timing control circuit controls the illumination information acquisition circuit to detect illumination information of the external flash at the preset timing.

11. The color correction detection device according to claim 10, wherein the color correction detection device comprises a human-computer interaction assembly configured to input a color correction control instruction; and wherein the timing control circuit is electrically connected to the human-computer interaction assembly, so as to control an illumination timing of the external flash and an acquisition timing of the illumination information acquisition circuit according to the received color correction control instruction.

12. The color correction detection device according to claim 1, wherein the color correction detection device comprises a display screen, and wherein the display screen is configured to display a color correction control interface; and wherein a displayed content of the color correction control interface comprises one or more of color correction start-stop information, color correction parameter setting information, and color correction mode switching information.

13. The color correction detection device according to claim 12, wherein the display screen is a touch screen for receiving a color correction control instruction.

14. The color correction detection device according to claim 1, wherein the color correction detection device further comprises a charging circuit; and wherein an input of the charging circuit is configured to be connected to power, and an output of the charging circuit is configured to be electrically connected to the external flash.

15. A color correction system comprising a color correction detection device, an external flash, and a terminal device;

wherein the color correction detection device comprises:

an illumination information acquisition circuit configured to acquire illumination information of the external flash;

a first communication circuit communicating with the terminal device, configured to transmit the illumination information to the terminal device and receive color correction result information from the terminal device, wherein the terminal device is configured to perform color correction processing according to the illumination information, and generate the color correction result information; and a second communication circuit electrically connected to the first communication circuit, configured to communicate with the external flash and transmit the color correction result information to the external flash, so as to correct illumination of the external flash;

wherein the color correction detection device, communicating with the terminal device, is configured to transmit acquired illumination information to the terminal device, wherein the terminal device is configured to perform color correction processing according to the illumination information, generate the color correction result information, and transmit the color correction result information to the color correction detection device, wherein the color correction detection device communicates with the external flash, so as to transmit the color correction result information to the external flash, and wherein the external flash corrects illumination according to the color correction result information;

wherein the color correction detection device further comprises a programming circuit, and the programming circuit is electrically connected to the second communication circuit, so as to program the color correction result information on a control chip in the external flash.

16. The color correction system according to claim 15, wherein the terminal device is one of a mobile phone, a tablet computer, a notebook computer, and a wearable device.

17. The color correction system according to claim 15, wherein the color correction detection device comprises a data conversion circuit, and wherein the data conversion circuit is electrically connected to the illumination information acquisition circuit, so as to convert an analog quantity of the acquired illumination information to a digital quantity of the illumination information.

18. The color correction system according to claim 15, wherein the color correction detection device further comprises a timing control circuit, and wherein the timing control circuit is electrically connected to the external flash, so as to drive the external flash to emit light at a preset timing; and wherein the timing control circuit is electrically connected to the illumination information acquisition circuit, so that when the external flash emits light at the preset timing, the timing control circuit controls the illumination information acquisition circuit to detect illumination information of the external flash at the preset timing.

* * * * *